May 27, 1952  J. W. BALDWIN  2,598,029
ARTICLE HOLDER FOR AUTOMOBILE VISORS
Filed Nov. 21, 1949
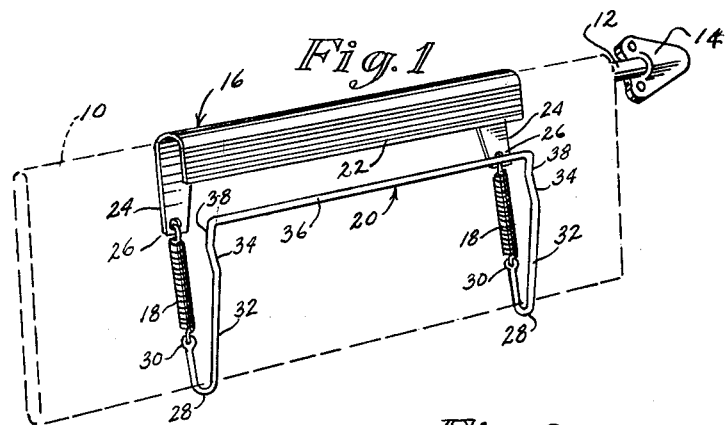
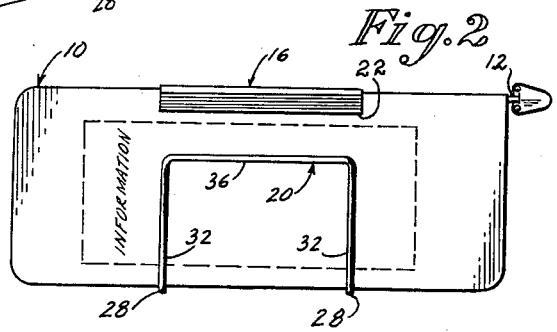
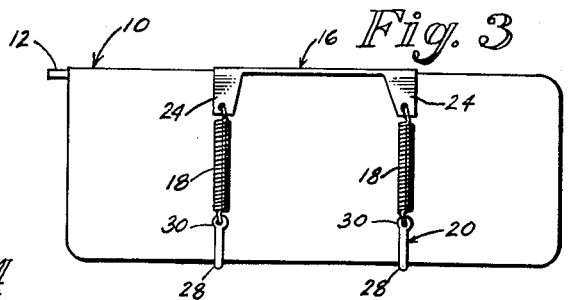
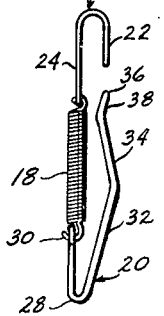
INVENTOR.
Joseph W. Baldwin
BY
Wayland D. Keith
HIS AGENT.

Patented May 27, 1952

2,598,029

UNITED STATES PATENT OFFICE 2,598,029

ARTICLE HOLDER FOR AUTOMOBILE VISORS

Joseph W. Baldwin, Wichita Falls, Tex.

Application November 21, 1949, Serial No. 128,601

3 Claims. (Cl. 248—311)

This invention relates to an article holder for automobile visors, and more particularly to a device for attachment to a conventional visor structure as used on automobiles whereby the same may be adapted for the carrying of maps, folders, booklets, or other articles and information in various forms, to keep the same always at hand for reference when needed.

The invention has for its principal object the provision of an article holder which is constructed to be easily applied to or removed from an automobile visor, and which is capable of use without modification with visors of widely varying sizes.

Another object of the invention is to provide an article holder of variable capacity, useful for the convenient arrangement in an orderly manner of information folders and the like, usually found in automobiles, and which as ordinarily allowed to accumulate, readily become soiled, torn, or lost.

A further object of the invention is to provide an article holder of the type referred to which is of simple design, and rugged construction, capable of withstanding the rough usage to which such an article is likely to be subjected.

With the above and other objects in view, the invention comprises, briefly stated, a curved member, generally hook-shaped in cross section, adapted to engage one edge of an automobile visor, a retainer member shaped to engage the opposite edge of the visor and having a portion disposed adjacent one face of the visor for retaining articles thereon, and resilient means connecting the two members at the opposite face of the visor for retaining the device in position thereon.

The invention will best be understood from the following description constituting a specification of the same, when taken in conjunction with the accompanying drawing wherein—

Fig. 1 is a perspective view of the invention, showing the manner in which the same is applied to a visor, indicated in dash outline;

Fig. 2 is a front elevational view of the invention applied to the visor;

Fig. 3 is a rear elevational view of the invention applied to the visor; and

Fig. 4 is an elevational view of the invention separate from the visor to which it is to be applied.

With reference to the drawing in greater detail, the invention is shown as applied to a conventional automobile visor structure generally indicated by 10, which visor is conveniently formed with a horizontally disposed shaft 12, supported and journaled at one end in a bearing 14. Such visors are usually positioned above the windshield of the automobile, and are adapted to be swung downwardly about the shaft 12 to shield the eyes of the occupant from the direct rays of the sun. The visor described is very widely used as a part of the equipment of motor vehicles and forms no part of the present invention, except in so far as it serves as a support for the article holder, and cooperates with the same in retaining the article in position on the visor.

The article holder is made up of an edge engaging member 16, resilient elements 18, and a retainer member 20. The edge engaging member 16 is generally hook-shaped in cross section and is formed with a downwardly extending portion 22 adapted to engage one face of the visor, and spaced depending portions or ears 24, provided with perforations 26 for the connection thereto of resilient members 18. The depending spaced apart portions or ears 24 lie along the face of the visor opposite the portion 22 of the edge engaging member. The retainer member 20 is preferably formed of metal wire, or similar material, bent into the shape indicated, and includes U-shaped bends 28, terminated by eyes 30 or the like for the attachment of the resilient members 18. The retainer member has upwardly extending portions 32 at one side of the visor, which portions are bent inwardly as indicated at 34, near their upper ends toward the face of the visor, and the portions 32 are joined by a horizontal portion 36. The horizontal portion 36 is spaced somewhat from the adjacent face of the visor by reason of the rebent portions 38 of the vertically disposed portions 32 of the retainer member.

The article holder is applied to the visor in the manner indicated in Fig. 1 of the drawings, and when so applied the resilient members 18 are preferably located at the back of the visor and the vertical portions 32 and horizontal portions 36 of the retainer member are positioned on the front of the visor, so that papers, maps, pamphlets, or other informational material, or the like, can be inserted between the retainer member and the adjacent face of the visor, and will be retained securely in place, as is indicated in Fig. 2. By reason of the rebent portions 38, which maintain the horizontal portion 36 of the retainer member slightly spaced from the adjacent face of the visor, the articles to be held can be readily inserted by merely pressing them downward edgewise between the retainer member and the adjacent face of the visor.

When an article has been inserted to the extent that it comes into engagement with the U-shaped portions 23 of the retainer member, it is then fully inserted, and cannot become displaced or drop out of the holder, since the portions 28 are at the bottom of the device and prevent further downward movement of the article.

The edge engaging member 16 being of generally hook-shape is readily positioned over the edge of any of a wide variety of visors of the character described, and due to the elasticity of the resilient members 18 the retainer member can be positioned over the opposite edge of the visor regardless of the width of the same, so that the holder is capable of application to visors of almost any width and of various thicknesses or formed of any kind of material. The holder is capable of retaining numerous articles of different shapes and sizes, and due to the fact that the retainer member can be forced away from the adjacent face of the visor to a very substantial distance, a number of articles of substantial thickness can be positioned in the holder at the same time and will be securely held therein. The pull of the resilient members 18 combined with the natural flexibility of the retainer member serves to press the retainer member firmly into engagement with any article inserted in the holder to effectively hold the article against the face of the visor.

The various parts of the holder can be fabricated of any suitable material, such as metal or plastic, having the requisite strength and physical characteristics to withstand the wear and tear incident to repeated use of the device.

It will thus be seen that the invention provides a device of simple design, which can be easily and inexpensively manufactured, and is capable of ready application to automobile visors for the purpose of keeping conveniently at hand any desired information or articles likely to be needed.

While the invention has been described in connection with a particular embodiment of the same, it is to be understood that various modifications can be made in the structure of the various parts, and in the materials employed, without departing from the spirit of the invention or the scope of the appended claims.

Having thus clearly shown and described the invention, what is claimed as new and desired to secure by Letters Patent is:

1. An article holder for application to an automobile visor and adapted to retain an article in engagement with a face of the visor, comprising an elongated channel shaped element disposed over an edge of the visor, a retainer member having a U-shaped bend disposed over the opposite edge of said visor, said retainer member having a portion in engagement with a face of said visor and a portion spaced from said face, and resilient means disposed on the opposite face of said visor connecting said element and said member to retain said holder on said visor.

2. An article holder for application to an automobile visor and adapted to retain an article in engagement with a face of the visor, comprising an elongated channel shaped element of sheet material disposed over an edge of the visor, a retainer member in the form of a bent wire having U-shaped bend disposed over the opposite edge of said visor, said retainer having an inwardly bent portion engaging face of said visor and an outwardly bent portion intermediate the transverse length thereof and spaced from said face, and resilient means connecting said element and said member across the opposite face of said visor.

3. An article holder for application to an automobile visor and adapted to retain an article in engagement with a face of the visor, comprising an edge engaging element of sheet material having a channel shaped portion disposed over an edge of said visor, said element having depending perforated ears adjacent its opposite ends on one side of said visor, a retainer member in the form of a bent wire having U-shaped bends disposed over the opposite edge of said visor, said bends terminating in eyes on the same side of said visor as said perforated ears, said member having vertical portions bent inwardly to engage the opposite side of said visor and a horizontal portion connecting said vertical portions spaced from said visor, and resilient means connecting said ears and said eyes.

JOSEPH W. BALDWIN.

REFERENCES CITED

The following references are of record in the file of this patent:

UNITED STATES PATENTS

| Number | Name | Date |
|---|---|---|
| 394,099 | Cummings et al. | Dec. 4, 1888 |
| 748,541 | Sullivan | Dec. 29, 1903 |
| 1,701,419 | Peden | Feb. 5, 1929 |
| 2,278,011 | Murdock | Mar. 31, 1932 |